(12) United States Patent
van der Kluit et al.

(10) Patent No.: US 10,938,708 B2
(45) Date of Patent: Mar. 2, 2021

(54) SEARCH FOR DISJOINT PATHS THROUGH A NETWORK

(71) Applicant: K.Mizra LLC, Los Angeles, CA (US)

(72) Inventors: Borgert Jan van der Kluit, 's-Gravenhage (NL); Adrianus Cornelis Gerardus Holtzer, 's-Gravenhage (NL); Bart Michel Magdalena Gijsen, 's-Gravenhage (NL); Hendrik Bernard Meeuwissen, 's-Gravenhage (NL)

(73) Assignee: K.Mizra LLC, Los Angeles, CA (US)

( * ) Notice: Subject to any disclaimer, the term of this patent is extended or adjusted under 35 U.S.C. 154(b) by 474 days.

(21) Appl. No.: 15/508,722

(22) PCT Filed: Sep. 7, 2015

(86) PCT No.: PCT/NL2015/050617
§ 371 (c)(1),
(2) Date: Mar. 3, 2017

(87) PCT Pub. No.: WO2016/036251
PCT Pub. Date: Mar. 10, 2016

(65) Prior Publication Data
US 2017/0295088 A1    Oct. 12, 2017

(30) Foreign Application Priority Data

Sep. 5, 2014    (EP) .................................... 14183814

(51) Int. Cl.
*H04L 12/735* (2013.01)
*H04L 12/721* (2013.01)
*H04L 12/741* (2013.01)

(52) U.S. Cl.
CPC .......... *H04L 45/128* (2013.01); *H04L 45/124* (2013.01); *H04L 45/1287* (2013.01);
(Continued)

(58) Field of Classification Search
CPC ...... H04L 45/128; H04L 45/12; H04L 45/124
See application file for complete search history.

(56) References Cited

U.S. PATENT DOCUMENTS 9,319,962 B2 *   4/2016   Wetterwald ........... H04W 40/04
2007/0070909 A1   3/2007   Reeve
(Continued)

FOREIGN PATENT DOCUMENTS

EP    1 335 315 A2    8/2003
EP    2 063 582 A1    5/2009

OTHER PUBLICATIONS

Dijkstra's shortest path algorithm (https://en.wikipedia.org/wiki/Dijkstra's_algorithm).
(Continued)

*Primary Examiner* — Esther B. Henderson
(74) *Attorney, Agent, or Firm* — Kinney & Lange, P.A.

(57) ABSTRACT

A path discovery process is provided for discovering a lowest cost combination of a plurality of paths from the source node to the destination node via links between pairs of nodes along the paths. A path discovery messages from a source node is forwarded through the network. Prior to forwarding the path discovery message a node tests one or more conditions for disabling the forwarding. Upon receiving an instance of the path discovery message, this may include testing whether no other instance of the path discovery message has both smaller cost and a previous path that contains only nodes that occur also in the path of the received instance. Furthermore, this may include testing whether a destination of the path discovery message was also a node to which a preceding node along the path has a further link, and a cost of the path from the preceding node to the next node via said further link is not larger than the cost of the path from the preceding node to the next node. Furthermore, this may include testing whether the node has
(Continued)

a further link to the destination node and the cost associated with the link to the next node is not less than the cost associated with the further link to the destination node.

20 Claims, 5 Drawing Sheets

(52) U.S. Cl.
CPC ............ *H04L 45/12* (2013.01); *H04L 45/123* (2013.01); *H04L 45/26* (2013.01); *H04L 45/54* (2013.01)

(56) References Cited

U.S. PATENT DOCUMENTS

| | | | |
|---|---|---|---|
| 2009/0296704 A1* | 12/2009 | Kim ..................... | H04L 45/20 370/389 |
| 2010/0172249 A1* | 7/2010 | Liu ...................... | H04L 45/124 370/252 |
| 2010/0322244 A1* | 12/2010 | Dasylva ............... | H04L 12/185 370/390 |
| 2011/0038254 A1* | 2/2011 | Hashiguchi .......... | H04L 45/1283 370/217 |
| 2011/0085449 A1* | 4/2011 | Jeyachandran ....... | H04L 41/12 370/248 |
| 2011/0228777 A1* | 9/2011 | Samajpati ............ | H04W 40/10 370/392 |
| 2012/0230199 A1* | 9/2012 | Chiabaut .............. | H04L 45/12 370/238 |
| 2012/0327792 A1* | 12/2012 | Guo ..................... | H04W 40/02 370/252 |
| 2013/0223277 A1* | 8/2013 | DeCusatis ........... | H04L 67/1097 370/254 |
| 2013/0250808 A1* | 9/2013 | Hui ...................... | H04W 40/023 370/255 |
| 2013/0279323 A1* | 10/2013 | Allan ................... | H04L 45/28 370/225 |
| 2014/0003232 A1* | 1/2014 | Guichard ............. | H04L 67/16 370/230 |
| 2014/0068105 A1 | 3/2014 | Thubert et al. | |
| 2014/0140216 A1* | 5/2014 | Liu ...................... | H04L 45/125 370/238 |
| 2014/0308040 A1* | 10/2014 | Sekiya ................. | H04J 14/0269 14/269 |
| 2015/0095466 A1* | 4/2015 | Pithewan ............. | H04L 41/0803 709/220 |
| 2015/0244605 A1* | 8/2015 | Grandi ................. | H04L 45/026 370/248 |
| 2015/0296279 A1* | 10/2015 | Bouda .................. | H04L 41/142 398/45 |
| 2015/0334629 A1* | 11/2015 | Patil .................... | H04W 40/12 370/338 |
| 2017/0126545 A1* | 5/2017 | Yi ........................ | H04L 45/22 |

OTHER PUBLICATIONS

Kawarabayashi, Ken-Ichi; Yusuke Kobayashi; and Bruce Reed. "The disjoint paths problem in quadratic time." Journal of Combinatorial Theory, Series B 102.2 (2012): 424-435.

* cited by examiner

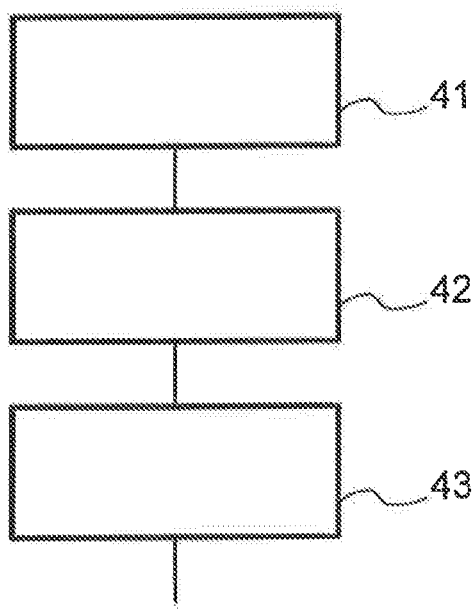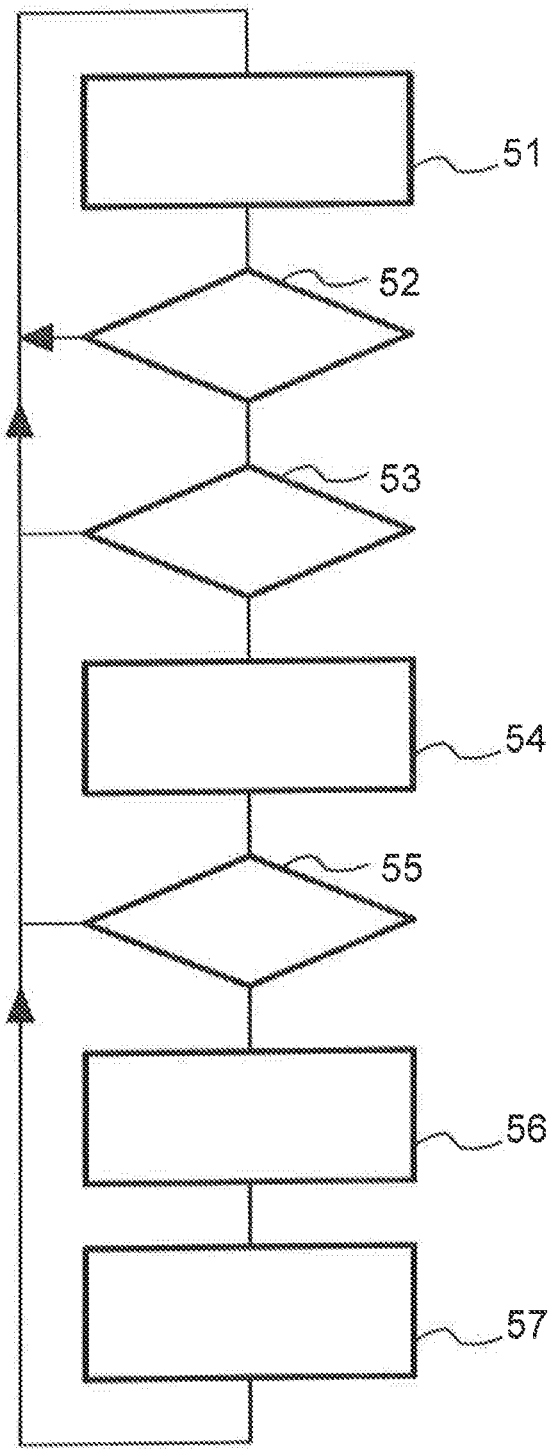

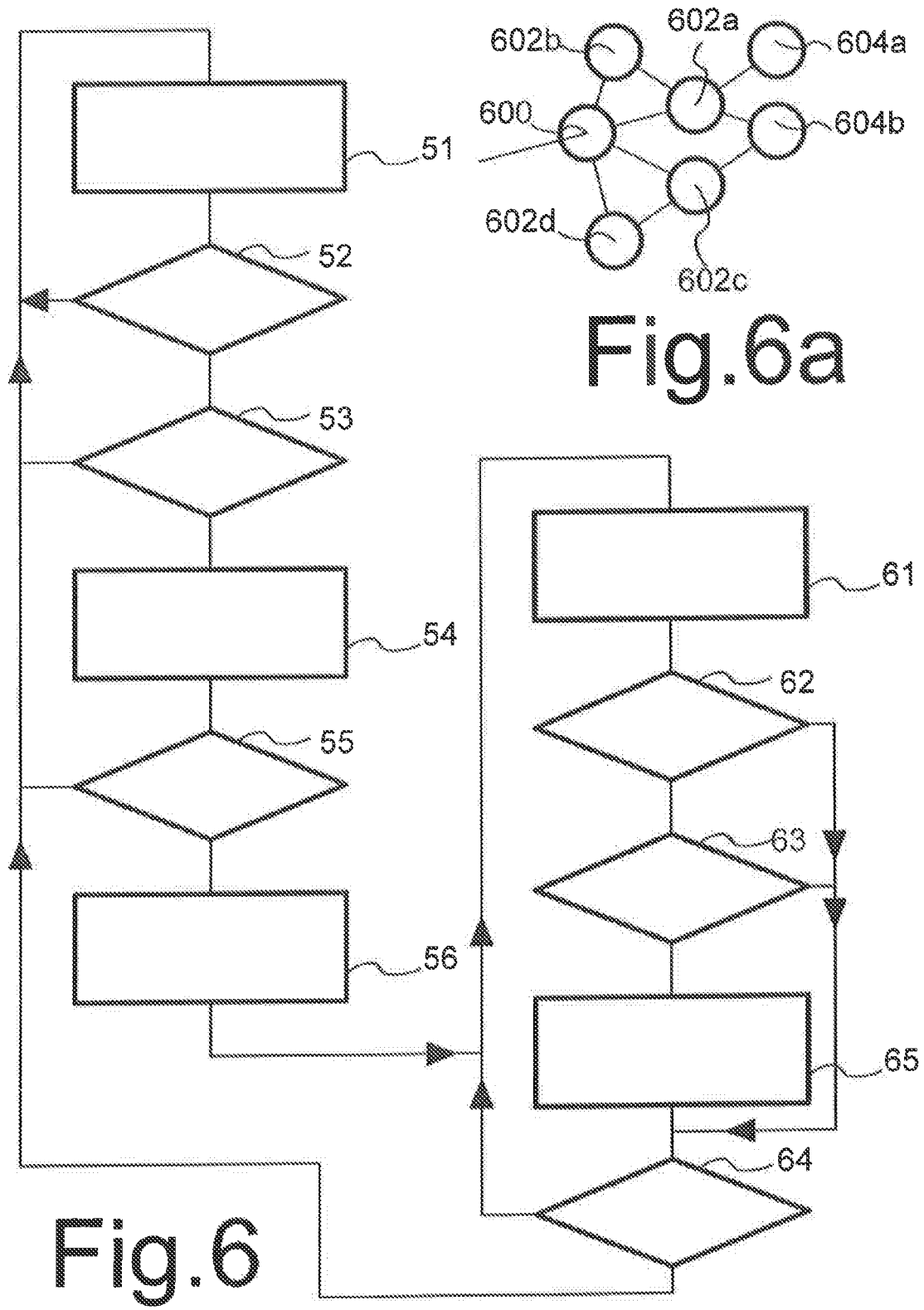

SEARCH FOR DISJOINT PATHS THROUGH A NETWORK

This application is the U.S. National Phase of, and Applicants claim priority from, International Patent Application Number PCT/NL2015/050617 filed 7 Sep. 2015, which claims priority from EP 14183814.4 filed 5 Sep. 2014, each of which is incorporated herein by reference.

FIELD OF THE INVENTION

The invention relates to a device for use as a node in a communication network, a method of using nodes in a communication network to search for disjoint paths through the network, and a communication network.

BACKGROUND

A communication network can be described in terms of devices, called nodes, and communication channels, called links, over which pairs of the nodes can communicate with each other. In the network messages between any source node and destination node are transmitted via nodes connected by a series of links, each node along the path forwarding the message via the link to the next node along the path.

When such a path is needed, the nodes of the network may be used to find an optimal path in advance. In this context, optimality is defined in terms of a "cost function", which is a sum of non-negative cost values assigned to individual nodes and/or links along the path. Possible cost functions may represent measures such as an amount of transmission time needed to reach the destination, fraction of available bandwidth used, energy used etc.

Methods of finding a single optimal path are known per se. A simple method is an exhaustive search, which considers all possible paths, computes the cost of each path and selects the path with lowest cost. The amount of work needed for a search can be reduced by use of pruning rules, which exclude (sets of) paths from the search before their cost is determined. Conventionally, such rules are applied to control expansion of partial paths between the source node and the destination node. For example, the well-known Dijkstra algorithm effectively provides an efficient set of pruning (or "branch-and bound") rules for finding shortest paths through a network. A basic pruning rule is the "no-loop" rule, which excludes any expansion of a partial path to a node that is already contained in the partial path. This rule keeps the number of paths finite. A more advanced rule is the "expand only from the best converging path" rule, which compares partial paths that converge at an intermediate node and expands only that one of those paths that has the lowest cost up to that intermediate node.

In some cases a decentralized optimum path search method is desired, for example if there is no entity that has a complete view of the network and network nodes only know their neighbor nodes (and the cost to reach them). Decentralized searches can be performed by propagating a path discovery message from the source node through the network, that is, by transmitting the path discovery message to each of its neighbors and forwarding the path discovery message from the neighbors to their neighbors and so on until the request message reaches the destination node, accumulating a sum of the costs along the way. In this case the pruning rules can be used to select request messages that will be forwarded. When the request messages have reached the destination node with information to track back their paths the destination node is able to select the lowest cost path and confirm the selected path by returning a confirmation message to that one of its neighbors that forwarded the request message and tracing back the path of that request message until the source node is reached.

Transmission of a message via disjoint paths can be used to exclude the risk that the message cannot reach the destination node if one node or link of the network malfunctions. Disjoint paths between the source node and the destination node are paths between the source node and the destination node that do not share any other nodes and hence also no links, at least when it is not trusted to share these nodes or links in different paths. Thus, disjoint paths are paths that do not share any nodes from a predetermined set of nodes that does not include the source and destination node, but may include all other nodes of the network.

As in the case of a search for a single optimal path, a search for a combination of disjoint paths can be performed by propagating a path discovery message through the network to identify possible paths. A lowest cost combination of such identified paths is selected that do not share any nodes from the predetermined set. It is desirable to minimize or at least reduce the number of messages that will be forwarded without compromising the ability of finding optimal disjoint paths. In this context, the operation of intermediate nodes in the network on possible paths between the source and destination plays an important role to select between forwarding based on local information so as to reduce forwarding without compromising the ability of finding optimal disjoint paths.

US20140068105 notes that its prior art disclosed a solution to the problem of finding disjoint paths wherein first a single optimal path is determined between the source and the destination, and then a second path that does not include any of the intermediate nodes of the first path.

US20140068105 notes that such a method cannot guarantee the location of diverse paths even if they exist, or provide for path optimization if they do exist. A path that would be optimal as a single path need not be optimal as one of a set of disjoint paths. For example when, in a search for a single optimal path, the "expand the best converging path" rule does not risk excluding the lowest cost path, but it does not ensure this for disjoint paths, because the lowest sub path may contain a node or link that could be avoided by an alternative path with little additional cost, but that could be indispensable for finding an additional disjoint path, or at least to prevent a significant increase in the cost of the additional disjoint path.

US20140068105 describes more reliable methods of finding disjoint paths for routing through a network. In an embodiment that uses an exhaustive search, this involves transmitting a path discovery message for a specified destination node from a source node to its neighbors, which can act as intermediate nodes on paths to the destination node. Intermediate nodes forward the path discovery message to their neighbors as possible intermediate nodes.

When it forwards the path discovery message, each intermediate node includes information about the path followed so far. The intermediate nodes repeat this until the destination node is reached. The destination node collects the different paths along which the path discovery message has reached it, and selects an optimal pair of disjoint paths. Note that in this search for disjoint paths, unlike in the search for a single optimal path, an intermediate node cannot discard path discovery messages that reach it from all but the lowest cost sub-path, or even be sure that the lowest cost sub-path will not be discarded later in favor of a more expensive sub-path.

US20140068105 notes that such a process can be burdensome because it involves flooding the entire network with the path discovery message. To address this, the document proposes an alternative wherein the network is partitioned into a plurality of non-overlapping logical networks. In this alternative, the single best path between the source and destination is determined for each of the logical networks. For this a similar path discovery message flooding technique can be used within the logical network, but because only one best path is needed within the logical network, less message forwarding may be needed. From the single best paths in different logical networks an optimal pair of paths is selected, which are disjoint because the logical networks are disjoint.

However, it cannot be guaranteed that this logical network partitioning based method will find the optimal disjoint paths. If there is no set of disjoint paths that are each wholly contained in a respective one of the logical networks, no set of disjoint paths will be found. But even if a set is found, it will not be optimal unless the nodes from the truly lowest cost set of disjoint paths are not wholly contained in respective ones of the logical networks. Furthermore it is a disadvantage that network information is needed to define the logical networks.

SUMMARY

It is an object to provide a device and method that improves the process of finding optimal disjoint paths from a source to a destination node.

A method for handling of path discovery messages is provided. This method may be applied by an intermediate node in a network during a search for disjoint paths through the network. As noted, the operation of such an intermediate node plays an important role by selecting between forwarding based on local information so as to reduce forwarding without compromising the ability of finding optimal disjoint paths. In the claimed method the intermediate node applies at least one of three conditions for forwarding a path discovery message. A first condition depends on instances of the path discovery message that the intermediate node has received earlier. According to this condition a further instance of the path discovery message is not forwarded unless it meets a condition that requires that none of the respective instances has a value of a measure of the costs of the links along its path to the intermediate node that is smaller than or equal to a value of said measure for the further instance and the further instance indicates a path that contains only nodes from a predetermined set that occur also in the path indicated by the further instance.

The predetermined set may include all nodes that may be used as intermediate nodes between the source and the destination, but in an embodiment preselected "trusted" nodes may be excluded from the predetermined set. The intermediate node may determine the measure of the costs based on information from the path discovery message. The information for determining the measure of path cost may be explicit cost information, but it may also be merely the indication of the path in the path discovery message. In an embodiment the measure of path cost is a sum of at least the cost values associated with the links along the path.

Per se, the first part of the first condition is known from searches for single optimal paths: in that case there is no need to forward a further path discovery message if any earlier path has a value of a measure of the costs that is smaller than or equal to a value of said measure for the further path discovery message. However, the criterion adds that this first part is insufficient to prohibit forwarding if the further path discovery message indicates a path that contains only nodes from a predetermined set that occur also in the path indicated by the an earlier path discovery message. Such an addition is meaningless for search for a single optimal path. But it can be proven that it ensures that it ensures that the condition does not exclude optimal combinations of disjoint paths from the search.

In addition, the intermediate node may enforce a "no-loop rule" based on the path of the further path discovery message itself, by not forwarding the further path discovery message to a next node if that node is already contained in the path of the further path discovery message. The claimed condition dependent on earlier received path discovery messages provides a reduction of path discovery message traffic independent of the no-loop rule.

If the second condition is used, the intermediate node may make use of information about possible paths that branch off from the path indicated by the path discovery message at one or more earlier node along that path. In an embodiment such branch information may be included into to the path discovery message by nodes. For use by other intermediate nodes, the intermediate node may insert such branch information in the path discovery message. But if the intermediate node has information about neighbors of its neighboring nodes branch information in the path discovery message may not be needed.

If the second condition is used, the intermediate node determines whether the next node to which it considers forwarding the path discovery message was also a node to which a preceding node along the path has a further link. If so the intermediate node does not forward the path discovery message to the next node unless the value of the measure of cost for the path from the preceding node to the next node via said further link is larger than the value of said sum for the path from the preceding node to the next node via the intermediate node. Effectively, this enables the intermediate node to reduce transmission by allowing it to predict cases wherein the next node will not need forward the path discovery message.

The third condition may be applied if the intermediate node also has a link to the destination node. Effectively, this enables the intermediate node to reduce transmission by allowing transmission to be avoided that is not needed for finding optimal combinations of disjoint paths.

The operation of the intermediate node may be executed as part of an overall search for an optimal combination of disjoint paths. The resulting combination of disjoint paths may be used for redundant transmission in order to increase robustness against failures of nodes or links and/or to distribute transmission in order to ensure that eavesdropping at a limited number of nodes or links cannot reveal all message traffic.

A network node device is provided to execute the method. The network node device may comprise a programmable data processor and a computer program product may be provides with a program of instructions to cause the data processor to perform the method. The computer program product may comprise a magnetic or optical disc, or a (non-volatile) semi-conductor memory that contains the instructions of the program.

BRIEF DESCRIPTION OF THE DRAWING

These and other aspects and advantages will become apparent from a description of exemplary embodiments with reference to the following figures.

FIG. 4 shows a flow chart of a process to select disjoint paths
FIG. 5 shows part of a discovery process
FIG. 6 shows an alternative discovery process
FIG. 6a shows neighboring nodes and links

DETAILED DESCRIPTION OF EXEMPLARY EMBODIMENTS

Figure 1:
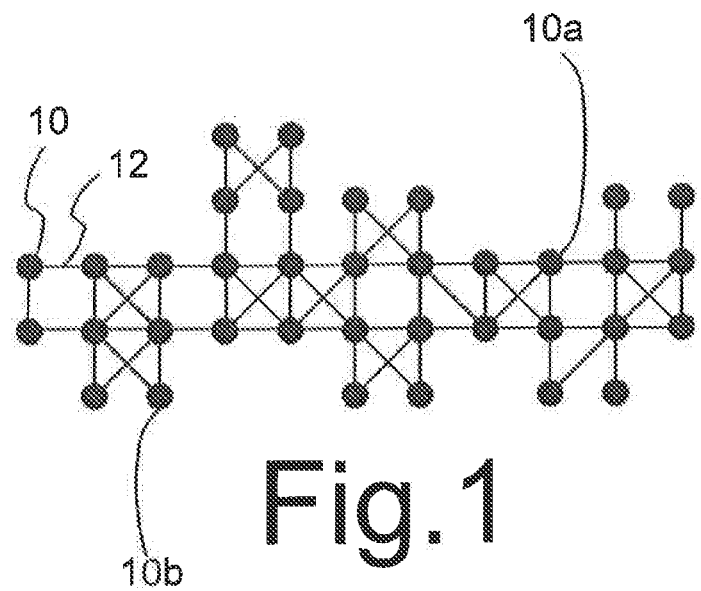
FIG. 1 shows a communication network

FIG. 1 shows a communication network comprising nodes 10 (one labeled), 10a,b and links 12 (one labeled) between pairs of the nodes. Nodes that are connected by a link are called neighbors. In operation, the network is used to transmit messages from a source node 10a to a destination node 10b along a communication path via a series of intermediate nodes. Whether a node will be used as the source node 10a or the destination node 10b or another node depends on external circumstances. In an embodiment, each of the nodes 10, 10a,b may become a source node, a destination node or an intermediate node in a communication path, or lie outside the communication path as needed. By way of example specific nodes 10a,b have been labeled explicitly as a source node 10a and a destination node 10b.

In an embodiment, the network may support Software Defined Networking (SDN), which is known per se. SDN enables intelligent forwarding of messages.

Figure 2:
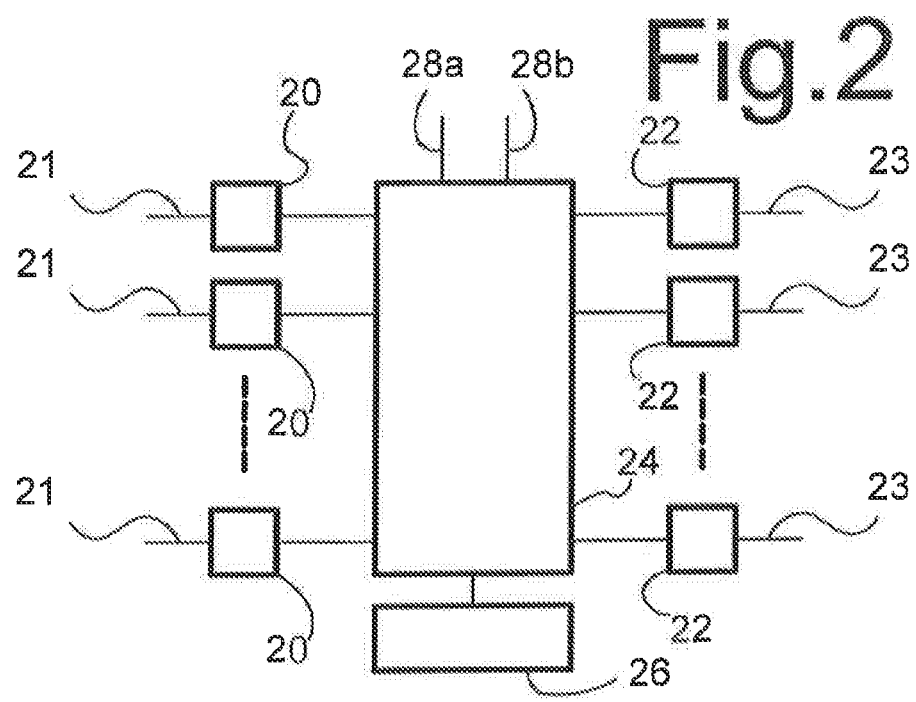
FIG. 2 shows a node device

FIG. 2 shows a node device for use as a node in the communication network of FIG. 1. The node device has a plurality of receivers 20 for receiving messages from respective links 21, a plurality of transmitters 22 for transmitting messages to respective links 23, a data processor 24 and a memory 26. Data processor 24 is coupled to receivers 20, transmitters 22 and memory 26. Furthermore, data processor 24 may have an input 28a and/or output 28b for communication with one or more terminal devices (not shown). When two-way links are used, links 21 and links 23 may be the same, and each link 21, 23 may be coupled both to a receiver 20 and a transmitter 22.

Figure 3:
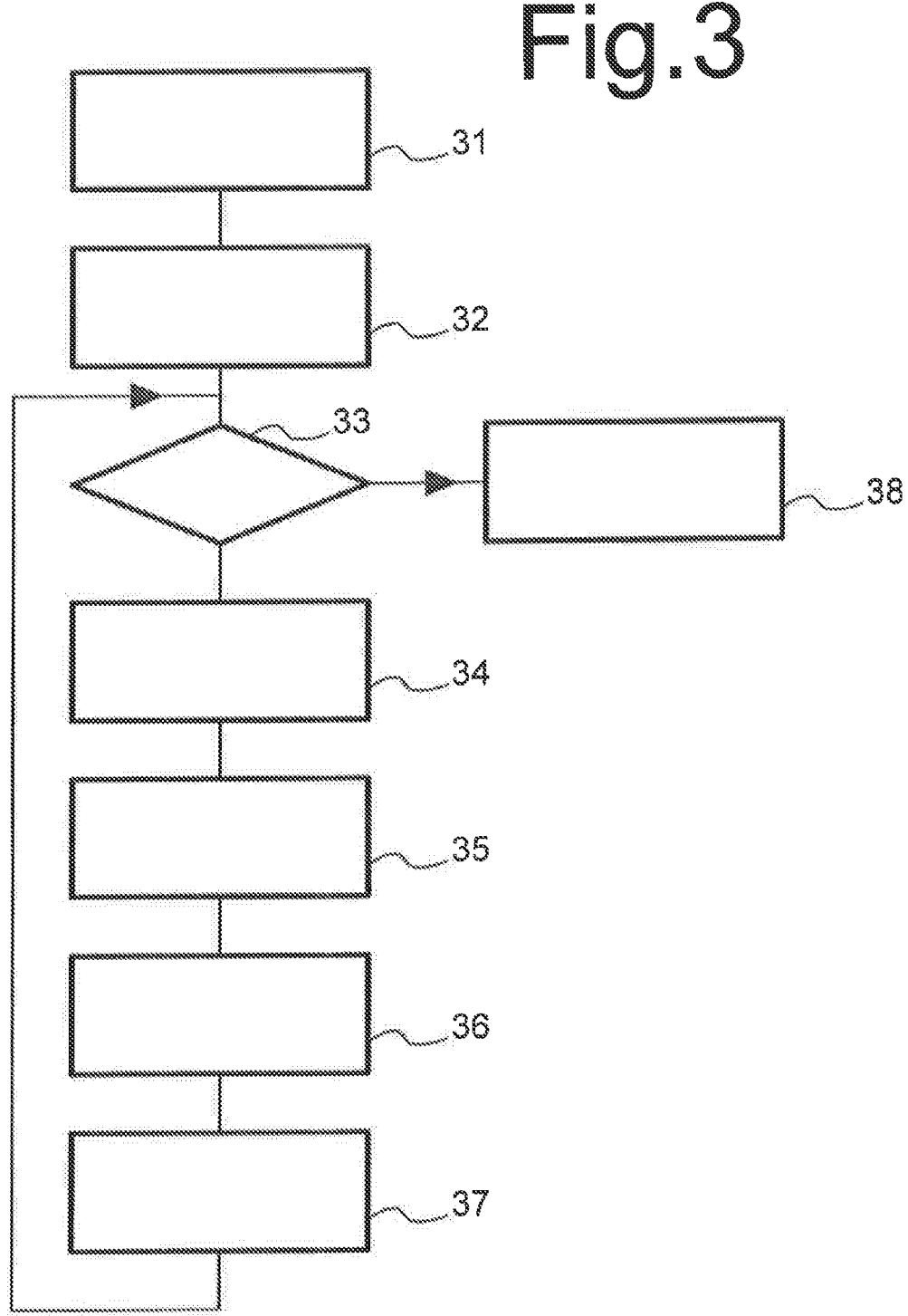
FIG. 3 shows a flow chart of a communication process

FIG. 3 shows a flow chart of an exemplary communication process. In a first step 31, a node device receives a set-up command to set up a communication session with a specified destination node. The set-up command may comprise an address of the destination node for example. The set-up command may originate from a terminal device in communication with the node device for example. Reception of the set-up command makes the node device function as a source node.

In a second step 32, a disjoint path discovery process is executed, which will be described in more detail with reference to FIGS. 4 and 5, and the communication network is set up to use a first and second discovered disjoint path as communication paths for the session. This may be done for example by causing each node along the first and second paths to store the address of the next node along the path in association with a session identifier, in which case each node may control the next step from that node along the path. Alternatively, the source node may store the addresses of all nodes along each path, in which case for each path the addresses along that path may be inserted in each message to be sent along the path.

In a third step 33, the source node tests whether the session should be ended. If not, the source node executes a fourth step 34 of receiving data for transmission in the session e.g. from the terminal device. In a fifth and sixth step 35, 36, the source node transmits the data in data messages to the next nodes of the first and second disjoint paths found in second step 32 respectively. Thus fifth and sixth steps 35, 36 are both executed for each message to transmit the message over the first path and the second path. Optionally only a subset of the messages of the session, which are indicated as critical messages, is transmitted over both paths. In this case, one of fifth and sixth step 35, 36 may comprise testing whether the message is critical and performing its transmission only if that is the case. In another embodiment, fifth and sixth step 35, 36 may be used to transmit different sub-sets of the messages from the session, to prevent that all messages from the session can be obtained by eavesdropping at a single point in the network.

In the embodiment wherein the nodes along the first and second paths store next node addresses in association with a session identifier, the session ID may be included in the data message. In the embodiment wherein the source node stores the addresses of the nodes along the paths, the addresses of the relevant path may be included in the data messages.

In a seventh step 37, the nodes forward the data messages along the paths. If the nodes and links along both paths function properly the data message will eventually reach the destination node along both paths. The process is repeated from third step 33 for successive data messages. The next data message may be transmitted from the source node before the previous message has arrived at the destination node, because the nodes operate in parallel. The flow-chart shows steps executed by different nodes in sequence merely for the sake of presentation.

If third step 33 detects the end of the session, the source node may execute an eight step 38 to transmit an end of session message along the paths, which may be used to free resources such as a stored session ID in the nodes along the paths.

FIG. 4, 5 show flow charts of exemplary processes to select disjoint paths involving the steps performed by source node 10a and other nodes respectively. It should be emphasized that the processes are exemplary, and that the same function can be performed by different processes.

The process makes use of path discovery messages that are transmitted between nodes. These will also be called (updated) instances of a path discovery message, to emphasize that the path discovery messages between different pairs of nodes are related to a common path discovery process. Each path discovery message (instance) may contain an identification (e.g. address) of the destination node of the path, an identification of the source node, and identifications (e.g. addresses) of nodes along the path that resulted in transmission of the path discovery message (instance). For each node on the path the path discovery message (instance) may also contain indications of each of the neighbor nodes to which the respective node has sent or will send a path discovery message (including the cost to reach the neighbor node). The path discovery message (instance) may also contain a session identifier to identify a particular search for disjoint paths (or a communication session for which the search is made), cost information, optional branch information, a hop count etc.

FIG. 4 shows the part of the discovery process executed by a node when it acts as source node. In the description of FIGS. 4 and 5 reference will be made to FIG. 2. In a first step 41, the data processor 24 of the source node 10a generates a path discovery message. In a second step 42, the data processor 24 of source node 10a causes transmitters 22 to transmit the path discovery message to the nodes 10 that are directly linked to the source node via respective single links 12 from the source node 10a. In a third step 43, the data processor 24 of source node 10a receives a report messages from receivers 20 after waiting for such a report to be returned.

FIG. 5 shows the part of the discovery process executed by a node 10, 10b when it acts as destination node 10b or intermediate node 10. In this process, the data processor 24 of the node 10, 10b may store information about paths to the node 10, 10b in memory 26. In a first step 51, the data processor 24 of the node 10, 10b tests whether a condition is met to complete the discovery process for a session (the condition may be based on a time-out, or reception of a path confirmation message for example). If not, the data processor 24 of the node 10, 10b executes a second step 52, testing whether a receiver 20 of the node 10, 10b has received a new path discovery message. If second step 52 detects that a receiver 20 of the node 10, 10b has received a new path discovery message, the data processor 24 of node 10, 10b executes a third step 53. If not the data processor 24 repeats the process from first step 51.

In third step 53, the data processor 24 of the node 10, 10b tests whether the list of nodes along the path indicated in the path discovery message contains all the nodes from a pre-defined set of nodes along at least one of the stored paths for which the node has stored information for the session indicated in the path discovery message. If such a stored path exists, its cost value is compared to the cost value of the path indicated in the path discovery message. If the cost value of the stored path is not higher than the cost value of the path discovery message, the path discovery message is discarded and the data processor 24 repeats the process from first step 51. If not, the data processor 24 of the node 10, 10b executes a fourth step 54.

It may be noted that comparison of the costs of the path indicated in the path discovery message and the cost of the stored path is similar to the test performed in the "expand only from the best converging path" rule for a single optimal path search. But in the search for disjoint paths, this rule is qualified by the condition that a more costly path is excluded only if it contains all the nodes along the stored path that is less, or equal costly. Only in this way it can be guaranteed that no potentially optimal disjoint paths will be excluded from the search. If disjoint paths would exist of which one includes the path indicated in the path discovery message, then lower or equal cost disjoint paths will also exist if one replaces the path indicated in the path discovery message by the stored path. So it suffices that the latter will be found.

In fourth step 54, the data processor 24 of node 10, 10b stores information from the path discovery message as a new part of the information about potentially optimal paths for the respective session identifier.

Optionally, third and fourth step 53, 54 may be delayed to allow for time to receive the path discovery message for a session via other paths, and to prevent storage of the current path discovery message if the test of third step 53 using these other paths for the session indicates that the current path can be discarded and the process can repeat from first step 51. In the embodiment wherein the path discovery message comprises a hop count, the data processor 24 may store the hop count in association with the path.

Next, in a fifth step 55, the data processor 24 of the node 10, 10b tests the received path discovery message to determine whether it is the node 10, 10b specified as the destination node in the path discovery message. If so, the data processor 24 repeats the process from first step 51. If not, the data processor 24 proceeds to a sixth step 56.

In sixth step 56, the data processor 24 of the node 10, 10b generates an updated version of the path discovery message. In an embodiment, the data processor 24 adds an indication of its node to a list of nodes along a path in the message.

In a seventh step 57, the data processor 24 of the node 10, 10b causes the transmitters 22 of the node 10, 10b to transmit the updated path discovery message, preferably excluding transmission to any node that already occurs in the path (no-loop pruning rule) of the transmitted message to the node 10, 10b. After seventh step 57, the data processor 24 repeats the process from first step 51.

As a result of these steps, the data processor 24 of the node 10, 10b collects information about paths for a session to the node 10, 10b. If the data processor 24 determines in first step 51 that the discovery process for a session must be completed for a session, the data processor 24 of the node 10, 10b executes an eight step 58 to complete the process for the session. After eight step 58 the data processor 24 repeats the process from first step 51.

The execution of eight step 58 in the node 10, 10b depends on whether the node 10, 10b is the destination node of the session or not.

If the node 10, 10b is the destination node of the session, the data processor 24 of the node 10, 10b selects a disjoint pair from the paths for which the node has stored information and transmits confirmation messages of the paths in the selected pair back to the destination node. A confirmation message for a path comprises the session ID and an indication of the succession of nodes along the pair of disjoint paths. The confirmation messages may be sent back along the paths of the selected disjoint pair of paths.

In an embodiment, the data processor 24 selects the pair by considering all possible pairs of the stored paths, discarding pairs where the paths are not disjoint, computing score values for the remaining pairs, e.g. as a sum of the cost values, and selecting the pair with the best score value (e.g. the lowest cost value).

If the node 10, 10b is an intermediate node for the session, the data processor 24 of the node 10, 10b may execute eight step 58 in response to a confirmation message. In this case the data processor 24 of the node 10, 10b may record that the node is part of a path for the session, as well as information indicating an adjacent node along the path, for use to forward data messages that may be received later during the session. Furthermore in this case, the data processor 24 of the node 10, 10b may cause the transmitter 22 associated with the path to forward the confirmation message back along the path. Data processor 24 may then discard other stored path information for the session.

If the node 10, 10b is an intermediate node for the session, the data processor 24 of the node 10, 10b may also execute eight step 58 in response to a time out for the discovery process for the session, or in response to reception of an error message for the session. In this case the data processor 24 of the node 10, 10b may discard the stored information representing sub-paths for the session, optionally sending back error messages along those sub-paths. Discarding stored messages frees memory for use to find paths for other sessions, but is not indispensable.

Returning to third step 43 of FIG. 4, if the data processor 24 of source node 10a, receives a confirmation message of a pair of disjoint paths for a session, it records the paths, or at least the first two disjoint nodes along the disjoint paths for that session. Subsequently, the paths can be used in the process of FIG. 2.

As described, the process requires the use of cost values. In an embodiment these cost values may be included in the path discovery messages, but this may not be necessary. It should be emphasized that the cost value can be accounted for in many ways. An aggregate cost value may be included in the path discovery message. In one embodiment the aggregate cost value in the message may include costs including those of the link over which the message was transmitted to the receiving node that executes the process of FIG. 5. In another embodiment the latter cost may be added by the receiving node. In other embodiments, the cost values of the individual links and/or nodes may be included in the path discovery message, so that they can be summed by any node that receives the path discovery message. If all nodes have access to data indicating the cost values of nodes and/or links and the information in the message about nodes and/or links along the path (e.g. type information) is sufficient to retrieve the data, it may not be needed to include explicit cost values in the path discovery message at all. Processor 24 may comprise a programmable computer with a stored program of instructions for the computer to perform the described steps. Data processor 24 may consist of a single programmable processing unit or a system of programmable processing units. The program of instructions for the data processor may be provided as a computer program product e.g. with instructions stored on a tangible medium such as a magnetic or optical disk or tape, in a (preferably non-volatile) semi-conductor memory.

Summarizing the processes, it should be noted that a disjoint path discovery process is used wherein nodes forward path discovery messages to their neighbors. However, not all path discovery messages are forwarded to all neighbors. A "no loop rule" may be applied that excludes transmission to any next node that occurs earlier in the path up. Furthermore transmission is also excluded if the cost value for the path of the path discovery message to the node is at least as high as that of another path to the node that was previously stored, provided that this other path contains only nodes that are also included in the path of the path discovery message. This condition is applied in third step 53.

This is based on the insight that such a path to an intermediate node cannot be part of one of an optimal pair of disjoint paths between the source node and the destination node, even if paths to the intermediate node have a higher cost value than other paths to the node. This is because use of any node in a path between the source node and the destination node could affect the possibility of finding an effective disjoint path. In other words, any node or combination of nodes used in a path to an intermediate node could have the effect that no effective disjoint path can be found between the source node and the destination node. The intermediate node, which is aware of paths through it, but unaware of disjoint paths, has no way of knowing which node or combination of nodes affects the ability to find an effective disjoint path.

However, if a first path to an intermediate node contains all the nodes of another path to that intermediate node and is at least as costly, it can be inferred that the first path can only worsen the possibility of finding disjoint paths. The third step 53 of the flow-chart of FIG. 5 uses this to discard sub-paths.

Although FIG. 5 illustrates an embodiment wherein this is done by the data processor 24 of a node to discard a sub-path indicated in an incoming path discovery message, it should be realized that alternatively, it could be used to prevent messages with such sub-path from being transmitted. In this embodiment, the data processor 24 of a transmitting node 10 may perform different tests like that of third step 53 for respective further node to which it has a link 12.

The number of transmissions of a path discovery message can be further reduced when a node makes use of predictions of the selection of transmission by neighboring nodes. Branch information may be used for this purpose. The branch information indicates neighboring nodes (branch targets) of node to which preceding nodes along the path may transmit path discovery messages that branch off from the path, but share the same preceding path. Optionally also including the cost to reach each of the branching nodes.

FIG. 6a illustrates an example wherein a node 600 has four neighboring nodes 602a-d. For one of these neighboring nodes 602a neighboring nodes 604a,b that are not also neighbors of node 600 are shown as well. In this example the branch information for node 600 may identify the three neighboring nodes 602b-d of node 600 to a first one of the neighboring nodes 602a. This enables the neighboring node 602a to predict operation of part of its neighboring nodes 602b-d if the neighboring node 602a would forward the path discovery message to those other neighboring nodes.

This can be illustrated as follows. From the branch information neighboring node 602a knows that when node 602b receives an instance of the path discovery message from node 600, the path associated with that instance contains all the nodes associated with the instance of the path discovery message from node 600 to node 602a. If the cost associated with paths equals the counts of links in the paths, it is also known that the cost of the path discovery message from node 600 to node 602b via 602a is higher than that directly from node 600 to node 602b, and otherwise the costs may be compared using specified costs for the nodes and/or links. For the same reason as paths may be discarded in third step 53) node 602b may discard the path discovery message that it would receive from node 602a when the cost of this path is not lower. This enables node 602a to predict that his message can be discarded and therefore need not send the path discovery message at all.

This example illustrates how including branch information in path discovery messages inserted by a node (in this example node 600) reduces transmission of path discovery messages elsewhere in the network (in this case between nodes 602b and 602a). Dependent on the network topology this may significantly reduce the number of transmitted path discovery messages.

In an embodiment, the branch information is included in the path discovery message by the node (e.g. node 600) at which the paths branch off, for use by a node (e.g. 602a) further on along the path. But this may not be needed if the node (e.g. 602a) further on along the path already has access to branch information for neighboring nodes. Similarly, the cost associated with the branch may be included in the path discovery message by the node (e.g. node 600) at which the paths branch off, but this is not needed if the node (e.g. 602a) further on along the path already has access to cost information for neighboring nodes FIG. 6 shows a flow chart of an embodiment that makes use of branch information, as executed by the data processor 25 of the first one of the neighboring nodes 602a. The flow chart is similar to that of FIG. 5 when the first one of the neighboring nodes 602a is used as node 10, and corresponding steps have been indicated by corresponding labels.

Seventh step 57 has been elaborated by a series of steps, and modified. A first to third step 61-63 and fifth step 65 may be used in the implementation described for FIG. 5 as well. In first step 61 the data processor 24 of the node 602a makes an initial selection of one of its neighboring nodes 602b, 604a,b. In second step 62, data processor 24 tests whether the neighboring node already occurs in the path of the path discovery message. If so, data processor 24 skips to a third step 63 wherein a next neighboring node is selected.

If not, data processor 24 executes a fourth step 64 wherein it determines whether the neighboring node 602b, 604a,b occurs in the branch information for the path of the received path discovery message and if so whether the aggregate cost of transmission to the neighboring node 102b, is at least as high as that of the transmission directly to the neighboring node 102b, according to the branch information. If so, data processor 24 skips to third step 63.

Herein the cost of transmission via the current node 102a is a sum of the cost of transmission to the current node 102a from the node 100 and the cost of transmission from the current node 102a to the neighboring node 102b. This is compared with the cost of transmission to the neighboring node 102b directly from the node 100 that is included in the branch information that node 600 sent to node 602a. When the latter cost is not higher than the former, aggregate cost, data processor 24 skips to third step 63. Instead of comparing the added costs from the node 100 that included the branch information, costs of overall paths may be compared with the same effect.

Data processor 24 proceeds to a fifth step 65 if data processor 24 does not skip from fourth step 64. In fifth step 65, data processor 24 causes a transmitter 22 of the node 102a to transmit the updated path discovery message to the neighboring nodes 102b and/or 104a,b. In the embodiment of FIG. 6, the updated path discovery message may include new branch information from the current node 102a.

Although the flow-chart of FIG. 6 shows execution of fifth step 65 (transmission of the updated path discovery message to the neighboring nodes) as part of the actions for a specific neighbor, in a loop that visits neighbors successively, it should be appreciated that alternatively the updated path discovery message may be transmitted to the neighboring nodes after completing the loop for all nodes. By including branch information in the path discovery message after all neighbor nodes (to which the path discovery message will be transmitted) are determined, maximum branching information is forwarded to the neighbor nodes. This makes it possible for the neighbor nodes to optimize their forwarding predictions and therefor reduce transmission of path discovery messages even further.

Although the flow-chart of FIG. 6 may be applied in all nodes, this is not necessary. In embodiments only one or more nodes may include branch information and only one or more nodes may apply fourth step 64. For neighboring nodes for which there is no branch information fourth step 64 may proceed directly to fifth step 65. As described for FIG. 5 cost information may be obtained in any way. In an embodiment, cost information for the branch targets in the branch information may be included in the path discovery message.

In third step 63, data processor 24 selects a neighboring node 102b, 104a,b that has not yet been processed. If such a node is available, the process is repeated from second step 62. If not the process is repeated from first step 51.

In the illustrated embodiment, data processor 24 complements path and branch information from its predecessors in the path discovery message by updated path and branch information for its own node. In an alternative embodiment, data processor 24 may add its branch information to the branch information from its predecessors, or replace branch information from more remote predecessors, so that the path discovery message contains branch information for branching from a plurality of nodes. In this embodiment fourth step 64 may include tests by comparing the neighboring nodes with more branch targets, to decrease transmissions to neighbors. However, transmitting only branch information from the node itself reduces the length of the path discovery message with a minimum loss of effectiveness.

Another prediction can be made if a neighboring node of a current node is the destination node of the path discovery message. In this case path discovery messages need not be transmitted to neighboring nodes other than the destination node if the added cost of using a path to such a neighboring node is not smaller than that of the added cost of the path to the destination node. In this embodiment, the flow chart of FIG. 5 or 6 may comprise an added step in combination with third step 53 or fourth step 64, wherein data processor 24 tests whether any of the links 23 of the node connects to the destination node specified in the path discovery message. If so, data processor 24 determines whether any of the other links 23 has a greater or equal cost compared to that link 23 and if so excludes transmission of the path discovery message over those links 23.

If a node is provided with information about its neighboring nodes and their links the data processor 24 of the node may compute further predictions. For example in an embodiment wherein the data processor 24 of a node has access to information about the identity of a set of nodes in its surroundings and the cost values associated with the nodes in that set and/or links to those nodes, the node may construct extended versions of the path indicated by a received path discovery message by adding nodes from the set and applying the test of third step 53 or fourth step 64 using the extended path instead of the path from the path discovery message and/or in addition to the stored paths.

In a further example use of information about neighboring nodes, third step 53 may be expanded by adding a sub-step that uses a criterion that uses information about shortcuts for discarding the path discovery message. For this purpose, the nodes may be configured to include information about shortcuts in the path discovery messages.

In particular, shortcut path detection for a received path discovery message received by a node N1 comprises (a) detecting that there is a preceding node N2 on the discovered path that has a neighbor node NN2 that is also one of the neighbors NN1 of the receiving node N1 and (b) the cost of the path up to the preceding node N2 via the neighbor node NN2 to the receiving node N1 is less than the cost of the path that the path discovery message has followed.

Like the test described for third step 53 the shortcut criterion can be seen as a modification of a test that is only suitable for discarding paths for selection of a single optimal path rather than a pair of disjoint paths. If a shortcut is detected by a receiving node, then the receiving node N1 could discard the received path discovery message for the purpose of selecting a single optimal path and it need not send it to any of its neighbors NN1. This is because any least cost single path to the receiving node N1 will involve the shortcut, so the path followed by the path discovery message cannot be part of the least cost single path. However, this shortcut rule only holds for finding optimal single paths, but not for determining an optimal pair of disjoint paths because it cannot be excluded that the path of the pair of path involves the shortcut.

There is a modification of this rule that does hold for disjoint paths. In particular, when a node N1 receives a path discovery message, the receiving node N1 may be configured to detect whether the path contains two overlapping shortcuts. This comprises testing whether there is (a) first shortcut via a node k between two nodes i and j on the received path i-j-N1 and there is (b) a second shortcut to the receiving node N1 from a node 1 via a node m on the path, where each of these nodes i, j, k, l and m are distinct and node l lies between nodes i and j on the received path i-l-j-N1). The receiving node N1 may be configured to discard the path discovery message if this is the case. This does not affect the finally selected pair of disjoint paths because it cannot be part of an optimal disjoint path.

In a further embodiment additional constraints on path discovery messages may be applied. For example, in step 53 it may be tested if the number of forwarded path discovery messages for a session exceeded a pre-defined maximum. If so, the data processor 24 may discard the path discovery message. This may result in suboptimal cost for disjoint path discovery process, but on the other hand it can prevent excessive growth of the number of path discovery messages that will be transmitted.

Although embodiments have been described wherein a pair of disjoint paths is selected, it should be appreciated that alternatively N disjoint paths may be determined, with N>2. For this, execution of eight step 58 by the destination node may be amended to select N disjoint paths. No change in third step 53 or its elaboration in FIG. 6 is required. Transmission of messages over N disjoint paths in parallel increases robustness when N is increased.

As noted, first step 51 tests whether a condition is met to complete the discovery process. In an embodiment the condition may be a time out for a session, e.g. a detection that more than a predetermined amount of time has elapsed since receiving a first path discovery message for the session. If a maximum node-to-node transmission time through the network is known, the predetermined amount of time may be set to that maximum. In an embodiment, the predetermined amount of time may be set dependent on the source node and the node that applies the condition.

Although embodiments have been described wherein all path discovery messages are forwarded except when they meet the described condition of not entirely containing another sub-path (optionally combined with a cost comparison), it should be appreciated that in other embodiments forwarding the path discovery messages may be disabled based on additional conditions. For example, forwarding the path discovery message may be disabled when the cost indicated in the threshold exceeds a predetermined maximum, e.g. a maximum specified in the path discovery message itself. This may be used to exclude paths with excessive costs. In an embodiment wherein a hop count is included in the path discovery messages and incremented at every node along the path, a test may be performed whether the hop count of the message from the source node exceeds a predetermined threshold. This may be used to exclude paths with excessive length. In another embodiment a hop count is included, but only nodes from a pre-defined set of nodes are counted. This may be used to exclude paths with an excessive number of nodes with specific characteristics.

Although embodiments have been described for establishing a session which lasts only for a limited time period, it should be appreciated that discovery of disjoint paths need not be limited to such sessions. Instead the term session may refer to all message traffic between the source and destination node. In this case the session ID may be defined by the addresses of the source and destination nodes.

Each message may comprise a header and payload data. The header may contain an indication of the type of message, a session ID and/or an address of the destination. However, as used herein the messages during the session need not contain more than payload data and information from which the path can be determined for the message.

Although embodiments have been described for establishing a session wherein messages are transmitted over one of the disjoint paths (primary) and the other, disjoint path is used as an alternative for transmitting messages in case there is a failure on the primary path, it should be appreciated that discovered disjoint paths can be used in other ways.

For example, for increased, seamless robustness of a session in case of a node or link failure each message, or at least each of a sub-set of critical messages, can be transmitted over each disjoint path.

Another example is to avoid eavesdropping by a "man in the middle" at a single link or node, part of the messages of the session (e.g. messages where the sequence number of the message in the session is odd) may be transmitted over a first one of the disjoint paths and another part of the messages (e.g. the even numbered messages) may be transmitted over a second one of the disjoint paths. When N>2 disjoint paths are used to distribute transmission of the messages of the session, obtaining all messages of the session by eavesdropping at less than N points in the network becomes impossible.

Apart from making eavesdropping more difficult, distribution over N>1 disjoint paths may be used to ensure that no bandwidth bottleneck can arise in the network where all messages of the session must pass.

Although embodiments have been described wherein the disjoint paths are discovered at the start of a session, it should be appreciated that discovery may be started at a later stage, for example before the start of a critical part of the session. Although embodiments have been described wherein the disjoint paths are discovered once for a session, it should be appreciated that repeated discovery may be used as well. For example, when the destination node detects that one of the disjoint paths ceases to function during the session, a new discovery process may be started to replace the disjoint paths for a subsequent messages in the session.

Although embodiments have been described wherein completely disjoint paths are used, it should be appreciated that instead it may suffice to search for partially disjoint paths that overlap at most at predetermined nodes. Such nodes or links may be called "trusted nodes". For example when battery powered nodes and line powered nodes are used and the disjoint paths are used for robustness against node failure due to battery exhaustion, line powered nodes might be "trusted nodes". Conversely, when disjoint paths are used for robustness against line failures, nodes with battery back-up might be trusted nodes. In this case, overlap needs to be excluded only for nodes in a predetermined set of nodes that includes all nodes that can be used for communication between the source and destination except for the trusted nodes. Information that indicates to the nodes whether a node is a trusted node may be provided for example by providing each node with a list of addresses of trusted nodes, or by using a distinguished type of address from the trusted nodes. If there are no trusted nodes, the predetermined set contains all nodes that can be used for communication between the source and destination.

The implementation of a search of partially disjoint paths in the case of trusted nodes may be realized by ignoring the trusted nodes in the determination whether all nodes of a stored path are contained in the path indicated by the path discovery message e.g. in third step 53. Similarly, there may be trusted links. Wired links might be trusted links in contrast to wireless links or vice versa. However, as long as a link is in a one to one relation with a destination it can be handled along with its destination.

In an embodiment, the path discovery message may indicate which nodes in the path are trusted and each node may ignore nodes according to this indication. A trusted node may add such an indication for itself in the path discovery message for example.

In the illustrated embodiments, the path discovery message contains identifications of nodes along the path followed by the path discovery message, and optionally about neighbors of such nodes. The destination node uses the information of nodes along the path during path discovery to determine whether different paths are disjoint. Intermediate nodes may use the information of nodes along the path, and optionally information about neighbors, during path discovery, when comparing paths.

The use of path information that openly identifies nodes may give rise to problems. For example, it means that interception of a path discovery message for a session could provide an eavesdropper with information of nodes that could be used to intercept at least part of the information exchange of the session. When the paths extend through a plurality of different network domains, incompatibility of identification methods in different domains could give rise to error. Furthermore, the path information might reveal confidential information about network topology.

In an embodiment, such problems may be addressed by assigning session specific node identifications to nodes for use in the steps involving path discovery messages, the session specific node identification not being used for the node outside the session. Preferably, the session specific node identifications differ from the addresses used to address messages to the nodes. Such session specific node identifications may be used in the process of disjoint path discovery as described using FIGS. 4-6, but also in other kinds of disjoint path discovery processes, for example in processes wherein intermediate nodes forward path discovery messages with other forms of testing or with less or no testing.

Figure 7:
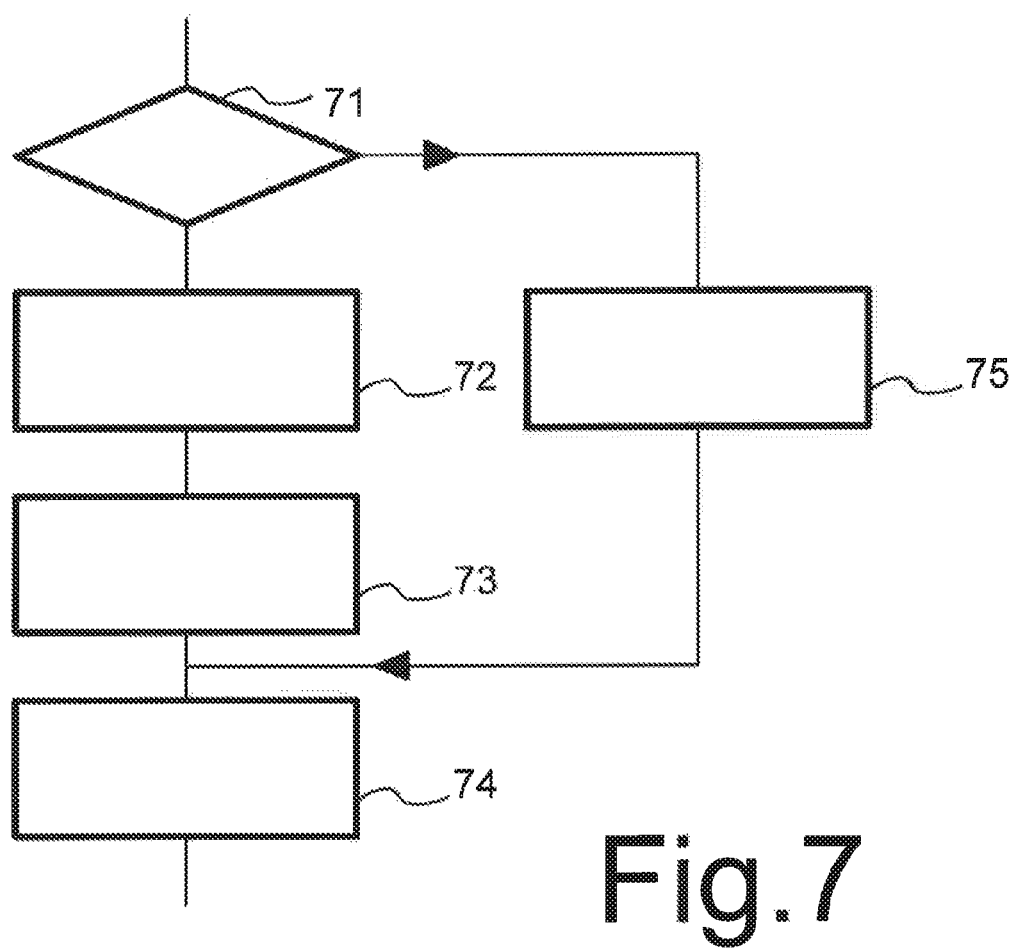
FIG. 7 illustrates session dependent identification

FIG. 7 illustrates a first embodiment, in which one or more nodes may each be configured to assign a session specific node identification for itself for use in the session in the steps for selecting disjoint paths, for example in the seventh step 37 of the process of FIG. 3. In the embodiment of FIG. 7, the nodes may store the assigned identification in association with session identifications for which the assigned identifications are assigned.

In a first step 71, executed for example as part of sixth step 56 of the process of FIG. 5, or more generally before the node forwards a path discovery message with a session identifier, the processor of the node tests whether it has stored an assigned identification for the session identifier that will be used in the forwarded message. If not, the processor of the node executes as second step 72, wherein it generates a new identification to identify its node in path discovery messages that include the session identifier. In a third step 73, the processor stores the newly generated identification in association with the session identification. In a fourth step 74, the processor inserts the newly generated identification in the path discovery message that will be forwarded.

The processor may be configured to generate the new identification e.g. by means of a random number generation process, and/or based on the time and/or date of reception. Generation may comprise random, time dependent and/or date dependent selection of the identification from a set of predetermined identifications, or use of a predetermined identification generation function as a function of random, time dependent and/or date dependent function arguments.

If the test of first step 71 shows that the processor has previously stored an assigned identification for the session identifier, the processor executes a fifth step 75, wherein it retrieves the previously stored identification associated with the session identifier. Subsequently, the processor proceeds to fourth step 74, using the previously stored identification instead of a new identification.

In another embodiment, a server for a network domain is used to supply the new identification to the node in response to a request from the processor of the node. In this embodiment, the processor may request the identification in a request that indicates the session identifier from a path discovery message each time when the node receives such a path discovery message. Alternatively, processor may cache identification provided by the server in association with the session identifier, and test for such a cached identification before requesting the identification from the server.

In another embodiment, the node identifications replaced by gateway nodes of a network domain that forward path discovery messages to other network domains. In this embodiment each node within the network domain may use its own identification to identify itself in path discovery messages for all sessions identifiers.

When the gateway node transmits a path discovery message from its network domain, the gateway node amends the path discovery message. The gateway node replaces the own identifications of those nodes that belong to the network domain by identifications that depend on the session identifier of the path discovery message.

Conversely, when a gateway node passes a path discovery message into its network domain, the gateway node uses the session identifier of the path discovery message to replace the session identifier dependent identifications of those nodes that belong to the network domain by the own identifications of these nodes.

A central server for the domain may be used to supply the session dependent replacement identifications for the different nodes in response to requests from gateway nodes that indicate the session identifier. As in the embodiment wherein all nodes themselves insert the session dependent identifications, each gateway node may use caching to reduce the number of requests.

In an embodiment, the generation of node identifications comprises encrypting a combination of the real identification and other information such as the session identifier or a random number. The key needed for decryption may be provided to gateways and/or nodes in the network domain. This enables these gateway nodes and/or nodes recover the real identification of other nodes from the network domain from the node identifications in the path discovery message without using a server.

Optionally, the nodes and/or gateway nodes may add information representing a simulated network domain topology in the path discovery messages. Different simulated network domain topologies may be used for different session identifiers. Thus for example, when a new session identifier is encountered, a nodes, a gateway and/or a server may associate the session identifier with a simulated network domain topology that contains one or more additional nodes than do not correspond to real existing nodes in the network domain. As another example, a combination of mutually connected real existing nodes may be replaced by a single simulated node in the simulated network domain topology, with links to the simulated node instead of links to the real existing nodes.

When a gateway node passes a path discovery message out of the domain, the gateway node (i.e. a processor in the gateway node) may add such additional nodes to the path represented in the path discovery message, consistent with the simulated network domain topology for the session identifier of the path discovery message. For example additional nodes may be inserted between real nodes. Conversely, the gateway node may remove such additional nodes from the path represented in the path discovery message, when the gateway node passes a path discovery message back into the domain. As another example, the gateway node may replace a part of the path that contains nodes from a combination of nodes that is represented by a single simulated node in the simulated network domain topology, by information representing the single simulated node. Instead of, or in addition to the gateway nodes, nodes inside the domain may make similar amendments.

The invention claimed is:

1. A method of operating an intermediate node in an information transmission network in a path discovery process for discovering a lowest cost combination of a plurality of paths from a source node to a destination node via links between pairs of nodes along the paths, different paths in the combination sharing no nodes from a predetermined set of nodes, the method comprising:
    receiving an instance of a path discovery message at the intermediate node, the received instance of the path discovery message comprising an indication of a path from the source node to the intermediate node that resulted in reception of the instance by the intermediate node;
    forwarding, by the intermediate node, an updated instance of the path discovery message based on the received instance via a link from the intermediate node to a next node, dependent on a result of testing at least a first condition; and
    disabling forwarding of the updated instance, by the intermediate node, when the received instance meets at least the first condition;
    wherein the first condition is met when both: (i) no further instance of the path discovery message received by the intermediate node has a value of a measure of path cost that is smaller than or equal to a value of said measure of path cost for the received instance; and (ii) the further instance indicates a further path that contains only nodes from said predetermined set that occurs also in the path indicated by the received instance.

2. The method according to claim 1, further comprising:
    disabling forwarding of the updated instance, by the intermediate node, when the received instance meets at least one of the first condition, a second condition, and a third condition;
    wherein the second condition is met when both: (i) the next node is also a node to which a preceding node along the path has a further link; and (ii) the value of said measure of path cost for the path from the preceding node to the next node via said further link is not larger than the value of measure of path cost for the path from the preceding node to the next node via the intermediate node; and
    wherein the third condition is met when both: (i) the intermediate node has a further link to the destination node; and (ii) the value of the measure of path cost associated with the link to the next node is not less than the value of the measure of path cost associated with the further link to the destination node.

3. The method of claim 2, further comprising forwarding, by the intermediate node, the updated instance dependent on a result of testing at least one of the first, second, and third conditions.

4. The method according to claim 2, further comprising forwarding, by the intermediate node, the updated instance when the received instance of the path discovery message fails to meet any of the first, second, and third conditions.

5. A method according to claim 1, wherein the intermediate node includes link information in the updated instance of the path discovery message, the link information indicating at least one further node, other than the next node, to which the intermediate node has a link.

6. A method of selecting combinations of disjoint paths through a network from a source node to a destination node, the method comprising
    propagating path discovery messages from the source node through the network, using the method of claim 1 in at least one intermediate node in the network;
    detecting arrival of instances of the path discovery messages at the destination node after forwarding via different paths through the network;
    selecting a lowest cost combination of said different paths wherein the paths in the combination are disjoint paths at the predetermined set of nodes.

7. A method according to claim 6, comprising transmitting a message a plurality of times in parallel through each of the paths in the selected combination of paths respectively, and/or transmitting respective parts of a message via respective ones of the paths in the selected combination of disjoint paths.

8. A method according to claim 1, comprising using node identifications representing domain nodes from a network domain in the indication of the path, different node identifications being selected for the same domain nodes for different sessions for selecting different combinations of paths.

9. A computer program product for operating an intermediate node in an information transmission network in a path discovery process for discovering a lowest cost combination of a plurality of paths from a source node to a destination node via links between pairs of nodes along the paths, different paths in the combination sharing no nodes from a predetermined set of nodes, the computer program product comprising a non-transitory computer readable storage medium having program instructions embodied therein, the program instructions adapted to be executed by at least one processor in the intermediate node which, when executed, cause the at least one processor:
    to receive an instance of a path discovery message at the intermediate node, the received instance of the path discovery message comprising an indication of a path from the source node to the intermediate node that resulted in reception of the instance by the intermediate node;
    to forward an updated instance of the path discovery message based on the received instance via a link from the intermediate node to a next node, dependent on a result of testing at least a first condition; and
    to disable forwarding of the updated instance when the received instance meets at least the first condition;
    wherein the first condition is met when both: (i) no further instance of the path discovery message received by the intermediate node has a value of a measure of path cost that is smaller than or equal to a value of said measure of path cost for the received instance; and (ii) the further instance indicates a further path that contains only nodes from said predetermined set that occurs also in the path indicated by the received instance.

10. A network node device for use in an information transmission network, the network node device comprising:
a receiver and a transmitter for communicating messages via links to further node devices in the network, the messages including instances of a path discovery message that indicate paths followed to the network node device;
a data processor configured to forward updated instances of the path discovery message via a link from the node to a next node based on the received instances of the path discovery message, dependent on a result of testing at least a first condition, and to disable forwarding of the updated instance when the received instance meets at least the first condition;
wherein the first condition is met when both: (i) no further instance of the path discovery message received by the intermediate node has a value of a measure of path cost that is smaller than or equal to a value of said measure of path cost for the received instance; and (ii) the further instance indicates a further path that contains only nodes from said predetermined set that occurs also in the path indicated by the received instance.

11. A network node device according to claim 10, wherein the data processor is configured to disable said forwarding of the updated instance at least when the received instance meets a second condition, the data processor being configured to obtain information about the further link for use in testing the second condition from the received instance of the path discovery message, and wherein the second condition is met when both: (i) the next node is also a node to which a preceding node along the path has a further link; and (ii) the value of said measure of path cost for the path from the preceding node to the next node via said further link is not larger than the value of measure of path cost for the path from the preceding node to the next node via the intermediate node.

12. A network node device according to claim 10, wherein the data processor is configured to include link information in the updated instance of the path discovery message, the link information indicating at least one further node, other than the next node, to which the intermediate node has a link.

13. A communication network, comprising a plurality of network nodes, including a network node device according to claim 10.

14. A communication network according to claim 13, comprising a source node configured to initiate transmission of the path discovery message and a destination node configured to receive instances of the path discovery message and to select a lowest cost combination of said different paths wherein the paths in the combination are disjoint paths at the predetermined set of nodes.

15. A communication network according to claim 14, wherein the source node is configured to use the selected combination of paths to transmit a message a plurality of times in parallel through each of the paths in the selected combination of paths respectively, and/or to transmit respective parts of a message via respective ones of the paths in the selected combination of disjoint paths.

16. A communication network according to claim 14, wherein the source node is configured to one of the selected combination of paths to transmit a message a plurality of times, until the source node is alerted that subsequent messages need to be transmitted over the other path.

17. A communication network according to claim 13, wherein the network node device is configured to operate alternatively as destination node or intermediate node between the source node and the destination node, dependent on whether the path discovery message indicates that the network node device is the destination node.

18. A method of operating an intermediate node in an information transmission network in a path discovery process for discovering a lowest cost combination of a plurality of paths from a source node to a destination node via links between pairs of nodes along the paths, different paths in the combination sharing no nodes from a predetermined set of nodes, the method comprising:
receiving an instance of a path discovery message at the intermediate node, the received instance of the path discovery message comprising an indication of a path from the source node to the intermediate node that resulted in reception of the instance by the intermediate node;
forwarding, by the intermediate node, an updated instance of the path discovery message based on the received instance via a link from the intermediate node to a next node, dependent on a result of testing at least one condition; and
disabling forwarding of the updated instance, by the intermediate node, when the received instance meets the at least one condition;
wherein the at least one condition is met when both: (i) the next node is also a node to which a preceding node along the path has a further link; and (ii) the value of said measure of path cost for the path from the preceding node to the next node via said further link is not larger than the value of measure of path cost for the path from the preceding node to the next node via the intermediate node.

19. A method according to claim 18, wherein the intermediate node disables said forwarding of the updated instance at least when the received instance meets said at least one condition, the intermediate node obtaining information about the further link for use in testing the at least one condition from the received instance of the path discovery message.

20. A method of operating an intermediate node in an information transmission network in a path discovery process for discovering a lowest cost combination of a plurality of paths from a source node to a destination node via links between pairs of nodes along the paths, different paths in the combination sharing no nodes from a predetermined set of nodes, the method comprising:
receiving an instance of a path discovery message at the intermediate node, the received instance of the path discovery message comprising an indication of a path from the source node to the intermediate node that resulted in reception of the instance by the intermediate node;
forwarding, by the intermediate node, an updated instance of the path discovery message based on the received instance via a link from the intermediate node to a next node, dependent on a result of testing at least one condition; and
disabling forwarding of the updated instance, by the intermediate node, when the received instance meets the at least one condition;
wherein the at least one condition is met when both: (i) the intermediate node has a further link to the destination node; and (ii) the value of the measure of path cost associated with the link to the next node is not less than the value of the measure of path cost associated with the further link to the destination node.

\* \* \* \* \*